April 12, 1932. F. G. BRADBURY 1,853,719
METHOD OF AND MEANS FOR TRANSPORTING PERISHABLE PRODUCE
Filed Jan. 4, 1926
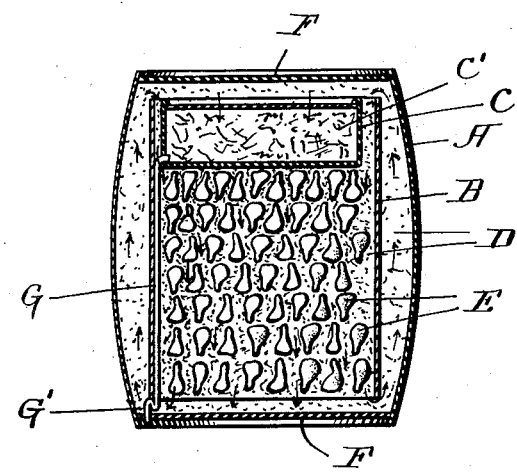
Inventor:
Frederick G. Bradbury Patented Apr. 12, 1932

1,853,719

UNITED STATES PATENT OFFICE

FREDERICK G. BRADBURY, OF LOS ANGELES, CALIFORNIA

METHOD OF AND MEANS FOR TRANSPORTING PERISHABLE PRODUCE

Application filed January 4, 1926. Serial No. 79,163.

This invention relates to improvements in method of and means for transporting perishable fruit and other produce. In the development of the art of transporting perishable goods it has become necessary to make small lot shipments of perishable fruit and other produce requiring or benefited by precooling and it is the primary object of this invention to provide an improved method of and means for effecting this result in a highly efficient and inexpensive manner.

In the accompanying drawing forming part of this specification, is shown a central vertical section through a container illustrating my invention.

In the drawing A is a wooden barrel but I desire to have it understood that this container may be of any suitable shape and design and made out of any suitable material. B is a cylinder of insulating board made out of wood fibre or any other suitable material and of any desired shape. This cylinder is placed vertically in the barrel and is of such diameter as will leave a space between it and the inner wall of the barrel. E indicates fruit (here shown is the perishable fresh fig) which is packed in dry sawdust D in the cylinder, said sawdust being packed in the space between the cylinder and the barrel. C is a closed ice container filled with ice C' and packed in the sawdust above the fruit in the cylinder, and G is a drain leading outwardly from the container and equipped with a trap G', said trap forming a water seal which prevents the escape of cold air from the ice container through said drain. F is the lid or head of the barrel which is secured in place after packing is completed. The sawdust filler is packed between the ends of the barrel and the fruit and ice container within to complete the insulation. In preparing the package the fruit, packing material and case are precooled before packing. This precooling before packing permits the cooling element C' to most effectively maintain the low temperature produced by precooling, prevents or retards the ripening processes of fruit E, which causes deterioration in transit to market, and makes possible the delivery of the fruit in sound, wholesome condition to the consumer. The arrows show the descending cold air through the filler from the ice in the container C and the upward movement of the warmer air from the fruit and any warm air or heat absorbed through the shell of the case from the exterior.

The cooling element C' need not necessarily be of the character shown, it being contemplated to also use any suitable refrigerant in place of the element C'. The filler D may be disintegrated wood or any other suitable poor heat conducting material through which the cold air from around the cooling element may circulate and which will serve as an efficient protecting filler around the fruit without injuring or tainting it. The filler due to its insulating properties retards the warming of the contents of the case in transit by tending to prevent the absorption of exterior heat and acts as a cushion to protect the lading against abrasion and bruising.

The container C as shown provides a relatively large surface for the release of refrigeration from C' and the filler and produce confined within cylinder D are subjected to the continuous and uniformly distributed action of refrigeration, due to the descending cold air currents from the refrigerating surface of said container through the filler. The filler serves to control this release of the refrigeration. The cylinder B also provides insulation for the lading and directs the course of refrigeration through and to all parts of the cylinder B containing the product.

Due to the produce and filler being precooled, to the filler having good insulating qualities, and to the refrigerant being supplied in abundance, a lower temperature of the produce is maintained, thus providing means for more effectively transporting perishable produce. Due to this improved combination the refrigerant does not require replenishing during a period of several days in transit during which a highly efficient low temperature is maintained for the preservation of produce with the least deterioration.

Having described my invention what I claim as new and desire to secure by Letters Patent is:

1. The method of packing, preserving and refrigerating small lot shipments of perishable produce during transportation in a container, which consists of packing precooled produce in a mass of precooled finely divided insulating filler in said container and of subjecting said produce to the continued and uniformly distributed action of refrigeration provided in said filler.

2. A small lot package of perishable produce, consisting, of a container, a mass of loose finely divided insulating filler of reduced temperature packed in said container in which the produce is placed and a refrigerant so placed in said filler as to subject the produce in the filler to the continued and uniformly distributed action of refrigeration.

3. A small lot package for perishable produce, consisting of a container, a wall spaced inwardly from said container, a filler of finely divided substantially dry material in the space within said inner wall, in which said perishable produce is adapted to be packed, a refrigerating element embedded in said filler adjacent to said produce, said filler serving to assist in retaining and distributing uniformly the refrigeration released from the refrigerating element within said inner wall.

4. A package for perishable produce, consisting, of a container, a mass of finely divided insulating material packed in said container in which said perishable produce is placed and a refrigerant so placed in said filler in such intimate association with said produce as to subject the produce in the filler to the continued and uniformly distributed action of refrigeration and to assist in controlling the release of refrigeration from the refrigerant.

FREDERICK G. BRADBURY.